United States Patent
Naribole et al.

(10) Patent No.: US 12,375,913 B2
(45) Date of Patent: *Jul. 29, 2025

(54) SYSTEMS, METHODS, AND DEVICES FOR ASSOCIATION AND AUTHENTICATION FOR MULTI ACCESS POINT COORDINATION

(71) Applicant: Samsung Electronics Co., Ltd., Suwon-si (KR)

(72) Inventors: Sharan Naribole, San Jose, CA (US); Srinivas Kandala, Morgan Hill, CA (US); Wook Bong Lee, San Jose, CA (US); Ashok Ranganath, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,468

(22) Filed: Jun. 13, 2023

(65) Prior Publication Data

US 2023/0328519 A1 Oct. 12, 2023

Related U.S. Application Data

(63) Continuation of application No. 16/944,135, filed on Jul. 30, 2020, now Pat. No. 11,696,129.

(Continued)

(51) Int. Cl.
*H04W 12/06* (2021.01)
*H04W 12/041* (2021.01)

(52) U.S. Cl.
CPC ......... *H04W 12/06* (2013.01); *H04W 12/041* (2021.01)

(58) Field of Classification Search
CPC . H04W 12/06; H04W 12/04; H04W 12/0431; H04W 12/041; H04W 12/0471
See application file for complete search history.

(56) References Cited

U.S. PATENT DOCUMENTS

| 7,234,063 B1 * | 6/2007 | Baugher ............... H04L 9/0891 713/153 |
| 7,263,357 B2 | 8/2007 | Lee et al. |

(Continued)

FOREIGN PATENT DOCUMENTS

| CN | 1455556 A | 11/2003 |
| CN | 101300809 A | 11/2008 |

(Continued)

OTHER PUBLICATIONS

Hiertz, Guido R., et al. "IEEE 802.11 s: the WLAN mesh standard." IEEE Wireless Communications 17.1 (2010): 104-111. (Year: 2010).*

(Continued)

*Primary Examiner* — Kari L Schmidt
(74) *Attorney, Agent, or Firm* — Renaissance IP Law Group LLP

(57) ABSTRACT

A method for associating and authenticating a station (STA) with a coordinated access point (AP) group may include generating a pairwise master key (PMK) between the STA and a coordinator of the coordinated AP group, and maintaining an association and authentication state between the STA and the coordinated AP group based on the PMK. The method may further include generating one or more temporal keys between the STA and the coordinator based on the PMK. The method may further include distributing the PMK from the coordinator to a first member AP and a second member AP of the coordinated AP group. The method may further include generating a first temporal key between the (Continued)

STA and the first member AP, and generating a second temporal key between the STA and the second member AP.

14 Claims, 8 Drawing Sheets

Related U.S. Application Data

(60) Provisional application No. 62/900,206, filed on Sep. 13, 2019.

(56) References Cited

U.S. PATENT DOCUMENTS

| | | | |
|---|---|---|---|
| 7,647,508 B2 | 1/2010 | Sood et al. | |
| 8,300,599 B2* | 10/2012 | Sood | H04W 8/26 455/432.1 |
| 8,813,201 B2* | 8/2014 | Lambert | H04W 84/045 726/6 |
| 8,964,662 B2 | 2/2015 | Goyal et al. | |
| 9,451,460 B2 | 9/2016 | Park et al. | |
| 10,028,179 B2 | 7/2018 | Cherian et al. | |
| 10,341,908 B1* | 7/2019 | Bhartia | H04W 36/0038 |
| 10,412,769 B2 | 9/2019 | Cherian et al. | |
| 10,764,790 B2* | 9/2020 | Kwon | H04W 28/26 |
| 2004/0141617 A1* | 7/2004 | Volpano | H04W 12/08 380/270 |
| 2004/0240412 A1* | 12/2004 | Winget | H04W 12/062 455/436 |
| 2004/0242228 A1* | 12/2004 | Lee | H04W 12/04 455/432.1 |
| 2005/0243769 A1* | 11/2005 | Walker | H04W 12/06 370/331 |
| 2006/0083377 A1* | 4/2006 | Ptasinski | H04L 63/0892 380/270 |
| 2007/0060043 A1* | 3/2007 | Qi | H04W 12/082 455/3.02 |
| 2007/0097934 A1 | 5/2007 | Walker et al. | |
| 2007/0280481 A1* | 12/2007 | Eastlake | H04W 12/50 380/277 |
| 2008/0051060 A1* | 2/2008 | Lee | H04L 63/0823 455/411 |
| 2008/0072047 A1* | 3/2008 | Sarikaya | H04L 9/0836 380/247 |
| 2008/0198821 A1* | 8/2008 | Volpano | H04L 12/4641 370/338 |
| 2010/0046468 A1* | 2/2010 | Oi | H04W 84/20 370/331 |
| 2011/0013608 A1* | 1/2011 | Lee | H04W 72/04 370/338 |
| 2011/0154039 A1* | 6/2011 | Liu | H04L 63/0869 713/168 |
| 2012/0327898 A1 | 12/2012 | Lu | |
| 2013/0263223 A1* | 10/2013 | Cherian | H04L 9/3273 726/4 |
| 2013/0300941 A1* | 11/2013 | Kafle | H04L 27/0006 348/725 |
| 2014/0010223 A1* | 1/2014 | Wang | H04W 48/12 370/338 |
| 2014/0050320 A1* | 2/2014 | Choyi | H04W 12/06 380/270 |
| 2014/0153513 A1* | 6/2014 | Lee | H04L 61/5014 370/329 |
| 2014/0282909 A1* | 9/2014 | Cherian | H04W 12/041 726/4 |
| 2015/0040195 A1* | 2/2015 | Park | H04W 12/062 726/4 |
| 2015/0334571 A1* | 11/2015 | Xu | H04W 12/06 455/410 |
| 2016/0127903 A1 | 5/2016 | Lee et al. | |
| 2016/0135053 A1* | 5/2016 | Lee | H04W 12/02 726/7 |
| 2016/0183084 A1* | 6/2016 | Balasubramanian | H04W 12/04 726/4 |
| 2016/0309384 A1* | 10/2016 | Zhang | H04W 36/0077 |
| 2016/0360404 A1* | 12/2016 | Benoit | H04W 12/04 |
| 2017/0164205 A1* | 6/2017 | Yang | H04W 72/23 |
| 2017/0318614 A1 | 11/2017 | Wang et al. | |
| 2018/0035338 A1* | 2/2018 | Wang | H04W 36/24 |
| 2018/0167811 A1 | 6/2018 | Shi et al. | |
| 2018/0242273 A1* | 8/2018 | Takahashi | H04B 7/088 |
| 2018/0278625 A1 | 9/2018 | Cammarota et al. | |
| 2018/0337903 A1* | 11/2018 | Utsugi | H04W 48/14 |
| 2019/0075465 A1* | 3/2019 | Grutzmacher | H04L 63/0876 |
| 2019/0223089 A1* | 7/2019 | Salgueiro | H04W 48/20 |
| 2020/0021400 A1* | 1/2020 | Cherian | H04L 5/0055 |
| 2020/0037372 A1* | 1/2020 | Rajendiran | H04W 24/08 |
| 2020/0076551 A1 | 3/2020 | Cherian et al. | |
| 2020/0106579 A1 | 4/2020 | Cherian et al. | |
| 2020/0127829 A1* | 4/2020 | Hsiao | H04W 12/041 |
| 2020/0245212 A1* | 7/2020 | Jia | H04L 41/0663 |
| 2021/0282007 A1* | 9/2021 | Ho | H04W 12/03 |
| 2024/0031801 A1* | 1/2024 | Ho | H04W 12/041 |
| 2024/0381077 A1* | 11/2024 | Orr | H04W 12/041 |

FOREIGN PATENT DOCUMENTS

| | | |
|---|---|---|
| CN | 101707769 A | 5/2010 |
| CN | 102804695 A | 11/2012 |
| CN | 103338448 A | 10/2013 |
| CN | 106797559 A | 5/2017 |
| KR | 20060126890 A | 12/2006 |
| KR | 20140130445 A1 | 11/2014 |
| TW | I280023 B | 4/2007 |
| TW | I341118 B | 4/2011 |

OTHER PUBLICATIONS

Zhang, Yinghui, et al. "Robust and universal seamless handover authentication in 5G HetNets." IEEE Transactions on Dependable and Secure Computing 18.2 (2019): 858-874. (Year: 2019).*

K.-H. Chi, Y.-C. Shih, H.-H. Liu, J.-T. Wang, S.-L. Tsao and C.-C. Tseng, "Fast Handoff in Secure IEEE 802.11s Mesh Networks," in IEEE Transactions on Vehicular Technology, vol. 60, No. 1, pp. 219-232, Jan. 2011. (Year: 2011).*

Lopez-Perez, David et al., "IEEE 802.11be Extremely High Throughput: The Next Generation of Wi-Fi Technology Beyond 802.11ax", Researchgate / publication / 331061786 (Feb. 2019).

Calhoun, Pat (Airespace), et al., "TAP proposal; 11-04-1183-01-000r-tap-proposal" IEEE Draft; 11-04-1183-01-000R-TAP-Proposal, IEEE-Samentor, Piscataway, NJ USA, vol. 802.11, No. 1, Dec. 18, 2004, XP017690064, [retrieved on Dec. 18, 2004], 33 pages.

Extended European Search Report for Application No. EP20194100.2, mailed Dec. 10, 2020.

Final Office Action for U.S. Appl. No. 16/944,135, mailed Oct. 11, 2022.

Fink, Andreas et al., "Empirical Performance Evaluation of Enterprise Wi-Fi for IIoT Applications Requiring Mobility", European Wireless 2021, 26th European Wireless Conference, Verona, Italy, 2021, pp. 1-8.

Hassan, Jahan A. et al., "Empirical Performance Evaluation of a Fast Authentication Scheme in Wireless Access Networks", ACS/IEEE International Conference on Computer Systems and Applications—AICCSA 2010, Hammamet, Tunisia, 2010, pp. 1-6.

IEEE Computer Society, "Part 11: Wireless LAN Medium Access Control (MAC) and Physical Layer (PHY) Specifications", IEEE Std 802.11-2016, IEEE Standard for Information Technology—Local and Metropolitan Area Networks—Specific Requirements.

Khorov, Evgeny et al., "Current Status and Directions of IEEE 802.11be, the Future Wi-Fi 7", IEEE Access, vol. 8, 2020 (May 8, 2020).

Lee, Wong Bong (Samsung) et al., "Virtual BSS For Multi AP Coordination", IEEE Draft; 11-19-1019-00-00BE-Virtual-BSS-For-Multi-AP-Coordination, IEEE-SA Mentor, Piscataway, NJ USA,

(56) References Cited

OTHER PUBLICATIONS vol. 802.11, EHT; 802.11be, Jul. 8, 2019, XP068152793, retrieved from the Internet: URL:https://mentor.ieee.org/802.11/dcn/19/11-19-1019-00-00be-virtual-bss-for-multi-ap-coordination.pptx, [retrieved on Jul. 8, 2019], 12 pages.

Liu, Jianhan et al., "Consideration on multi-AP coordination for EHT", IEEE Draft 802. 11-18/1982 R1, IEEE-SA, Mentor, Piscataway, NJ USA, No. 1, Jan. 9, 2019, XP068147487, Retrieved from the Internet: URL:https://mentor.ieee.org/802.11/dcn/18/11-18-1982-01-0eht-consideration-on-multiap-coordination-for-eht.pptx [retrieved on Jan. 9, 2019], 10 pages.

Nan, Li (ZTE), et al., "Consideration on Multi-AP Coordination", IEEE Draft; 11-19-1129-00-00BE-Consideration-on-Multiap-Coordination, IEEE-SA Mentor, Piscataway, NJ USA, vol. 802.11, EHT; 802.11be, Jul. 15, 2019, XP068152992, Retrieved from the Internet: URL:https://mentor.ieee.org/802.11/dcn/19/11-19-1129-00-00be-consideration-on-multiap-coordination.pptx, [retrieved on Jul. 15, 2019], 8 pages.

Naribole, Sharan (Samsung) et al., "Virtual BSS 1-20 for Multi-AP Coordination Follow-Up", IEEE Draft; 11-19-1451-01-00BE-Virtual-BSS-For-Multi-AP-Coordination-Follow-Up. IEEE-SA Mentor, Piscataway, NJ USA, vol. 802.11 EHT; 802.11be. No. 1, Sep. 17, 2019, XP068153855, Retrieved from the Internet: URL:https://mentor.ieee.org/802.11/dcn/19/11-19-1451-01-00be-virtual-bss-for-multi-ap-coordination-follow-up.pptx [retrieved on Sep. 17, 2019], 14 pages.

Notice of Allowance for U.S. Appl. No. 16/944,135, mailed Feb. 22, 2023.

Office Action for Application No. EP20194100.2, mailed Sep. 27, 2022.

Office Action for U.S. Appl. No. 16/944,135, mailed Apr. 14, 2022.

\* cited by examiner

SYSTEMS, METHODS, AND DEVICES FOR ASSOCIATION AND AUTHENTICATION FOR MULTI ACCESS POINT COORDINATION

CROSS-REFERENCE TO RELATED APPLICATIONS

This application is a continuation of U.S. patent application Ser. No. 16/944,135, filed Jul. 30, 2020, which claims priority to, and the benefit of, U.S. Provisional Patent Application Ser. No. 62/900,206 filed Sep. 13, 2019 which are both incorporated by reference.

TECHNICAL FIELD

This disclosure relates generally to multi-access point (AP) coordination, and more specifically to systems, methods, and devices for association and authentication for multi-AP coordination.

BACKGROUND

Connectivity between a station (STA) and an AP may involve association and authentication of the STA and the AP. Coordination of multiple APs may involve association and authentication of a STA with multiple APs.

The above information disclosed in this Background section is only for enhancement of understanding of the background of the invention and therefore it may contain information that does not constitute prior art.

SUMMARY

A method for associating and authenticating a station (STA) with a coordinated access point (AP) group may include generating a pairwise master key (PMK) between the STA and a coordinator of the coordinated AP group, and maintaining an association and authentication state between the STA and the coordinated AP group based on the PMK. The method may further include generating one or more temporal keys between the STA and the coordinator based on the PMK. The method may further include performing a handshake between the STA and the coordinator through a member AP of the coordinated AP group. A member AP of the coordinated AP group may forward data frames between the STA and the coordinator. The method may further include performing joint transmissions between the STA and first and second member APs of the coordinated AP group. The method may further include performing joint transmissions between the STA and any number of member APs of the coordinated AP group.

The method may further include distributing the PMK from the coordinator to a first member AP and a second member AP of the coordinated AP group. The method may further include generating a first temporal key between the STA and the first member AP, and generating a second temporal key between the STA and the second member AP. Generating a first temporal key between the STA and the first member AP may include performing a first handshake between the STA and the first member AP, and generating a second temporal key between the STA and the second member AP may include performing a second handshake between the STA and the second member AP.

The coordinated AP group may be advertised in one or more of a beacon, a probe response, or an association response. The method may further include sending an association request from the STA to the coordinated AP group through a member AP of the coordinated AP group, and sending an association response from the coordinated AP group to the STA through the same member AP, wherein the association response may indicate a mode for authenticating the STA with the coordinated AP group. The association may include a coordinator key holder identifier (ID). The method may further include dynamically selecting at least one anchor AP for the STA from one or more member APs in the coordinated AP group. The STA and the coordinated access point (AP) group may form a virtual basic service set (V-BSS). The V-BSS may be advertised using a V-BSS information element (VBIE) in a beacon frame.

A wireless station (STA) may include a wireless transceiver, and a device controller configured to communicate, through the wireless transceiver, with a coordinated access point (AP) group, generate a pairwise master key (PMK) between the STA and a coordinator of the coordinated AP group, and maintain an association and authentication state between the STA and the coordinated AP based on the PMK. The device controller may be further configured to generate a temporal key between the STA and the coordinator of the coordinated AP group. The device controller may be further configured to generate a temporal key between the STA and a member AP of the coordinated AP group.

A wireless access point (AP) may include a wireless transceiver, and a device controller configured to communicate, through the wireless transceiver, with a wireless station (STA), and maintain an association and authentication state between the STA and a coordinated AP group based on a PMK generated between the STA and the coordinated AP group. The device controller may be further configured to forward data frames between the STA and a coordinator of the coordinated AP group based on an authentication between the STA and the coordinator. The PMK may be a first PMK, and the device controller may be further configured to receive a second PMK from a coordinator of the coordinated AP group based on the first PMK, and generate a temporal key with the STA based on the second PMK.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments disclosed herein. The figures do not describe every aspect of the teachings disclosed herein and do not limit the scope of the claims. The accompanying drawings, together with the specification, illustrate example embodiments of the present disclosure, and, together with the description, serve to explain the principles of the present disclosure.

DETAILED DESCRIPTION

Overview

Figure 1:
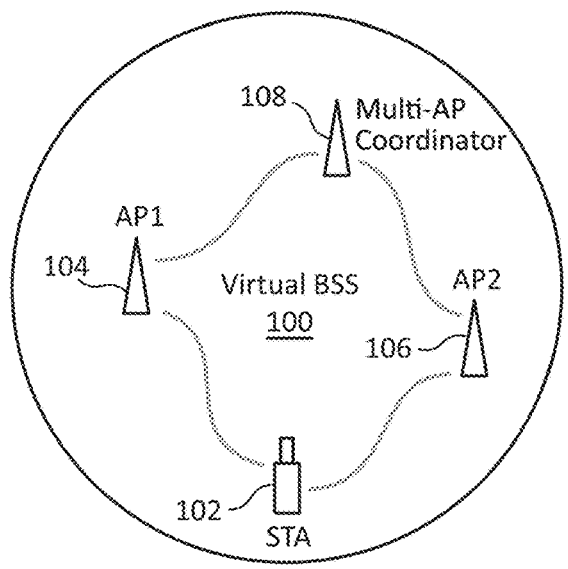
FIG. 1 illustrates an example embodiment of a virtual basic service set according to this disclosure.

Some embodiments according to this disclosure may implement association and/or authentication techniques that may enable a station (STA) to maintain simultaneous connectivity to multiple access points (APs) in a group of coordinated APs. This may enable a STA to seamlessly exchange data frames with multiple APs without reassociation and/or reauthentication. Simultaneous connectivity may be accomplished, for example, by establishing and/or maintaining a common association and authentication state for the STA and the group of coordinated APs. A group of coordinated APs may be implemented, for example, as a virtual basic service set (V-BSS).

In some embodiments according to this disclosure, establishing a common association and authentication state may involve first establishing a security association between a STA and a coordinated AP group, and then performing an authentication between the STA and the coordinated AP group.

In one mode of authentication according to this disclosure, the STA may authenticate on a coordinator level by generating temporal keys with the coordinator based on a pairwise master key (PMK). In such an embodiment, the coordinator may perform some or all of the data encryption and decryption, and the member APs may serve as relays to forward data frames between STA and the coordinator.

In another mode of authentication according to this disclosure, the STA may authenticate on an AP level. In such an embodiment, the coordinator may derive one or more AP level pairwise master keys (PMK-APs) based on the coordinator level PMK (PMK-Coordinator), and distribute the PMK-APs to one or more member APs in the coordinated AP group. The STA may then authenticate by generating temporal keys with one or more of the member APs based on the PMK-APs. In such an embodiment, the encryption and decryption may be performed, for example, by the member AP using the temporal key generated between the member AP and the STA.

In some embodiments, once a common association and authentication state is established between the STA and the group of coordinated APs, the STA may maintain connections with multiple APs in the group. This may enable the STA to roam freely and select different APs to exchange data frames with, while reducing or eliminating overhead associated with reassociating and/or reauthenticating for transitions between different APs.

Multi-AP Coordination

Multi-AP coordination may enable some embodiments to provide seamless exchange of data frames between a STA and multiple coordinated APs. Multi-AP coordination may be implemented using one or more coordination techniques such as joint processing and/or transmission, coordinated orthogonal frequency division multiple access (OFDMA), null steering beamforming, coordinated beamforming, AP selection, and/or the like. In some embodiments, one or more APs used for uplink (UL) and/or downlink (DL) transmission may vary on a per-frame basis depending on, for example, link quality, load balancing, and/or the like.

In some embodiments, multi-AP coordination may involve seamless exchange of frames between a STA and coordinating APs without negotiation overhead. This may be implemented, for example, by providing simultaneous connectivity between a STA and multiple APs.

Multi-AP coordination may also involve one or more secure connections between a STA and coordinating APs. In some embodiments, this may be implemented, for example, with a common authentication and association state. In some embodiments, one or more secure connections may be implemented with different encryption for different multi-AP coordination techniques.

Virtual Basic Service Set

In some embodiments, multi-AP coordination may be implemented using a virtual basic service set (V-BSS) which may include, for example, an infrastructure BSS with a coordinated group of APs.

FIG. 1 illustrates an example embodiment of a V-BSS according to this disclosure. In the V-BSS 100 illustrated in FIG. 1, the coordinated AP group may include a coordinator 108, a first member AP 104 and a second member AP 106. In some embodiments, the member APs may share the same service set identifier (SSID) and/or the same basic service set identifier (BSSID). The member APs may also share an association and/or authentication with a STA 102 such that, when the STA 102 is roaming within the virtual BSS 100, no reassociation and/or reauthentication may be involved. In some embodiments, the coordinator 108 may be implemented as a separate component, while in other embodiments, it may be integrated with one or more of the member APs.

In some embodiments, the STA 102 may use the same association identifier (AID) in the V-BSS 100. For example, after an AID is assigned by the coordinator 108, it may be shared among all APs in the group of coordinated APs (e.g., the first member AP 104 and the second member AP 106 shown in FIG. 1).

In some embodiments, the STA 102 may select an anchor AP from the member APs based on link quality metrics such as received signal strength indicators (RSSIs). The STA 102 may keep a local copy of capabilities of the anchor AP and/or neighboring member APs of the coordinated AP group. The STA 102 may obtain link quality metrics for each link between the STA 102 and member APs which may be obtained, for example, through measurements at the STA 102 (e.g., RSSI), or from information received from member APs such as a member AP's channel capacity to a coordinator, a member AP's capabilities, and a number of STAs attached to a member AP. A member AP may send AP side link quality metric information measured at member APs (AP side link quality metrics) to the STA 102.

In some embodiments, the anchor AP may be used to relay transmissions between the STA 102 and coordinator 108. Association and/or authentication of the STA 102 with at least one anchor AP may be shared with some or all APs in the coordinated AP group, which may allow the STA 108 utilize any subsequently selected anchor AP to relay transmissions without reauthentication.

Alternatively, or additionally, in some embodiments, the coordinator 108 may select the anchor AP for the STA 102 based on, for example, link quality metrics. In other embodiments, a combination of STA driven AP selection and coordinator controlled AP selection may be implemented. For example, the STA 102 may select a first anchor AP for uplink (UL) transmissions, and the coordinator 108 may determines a second anchor AP for downlink (DL) transmissions.

Figure 2:
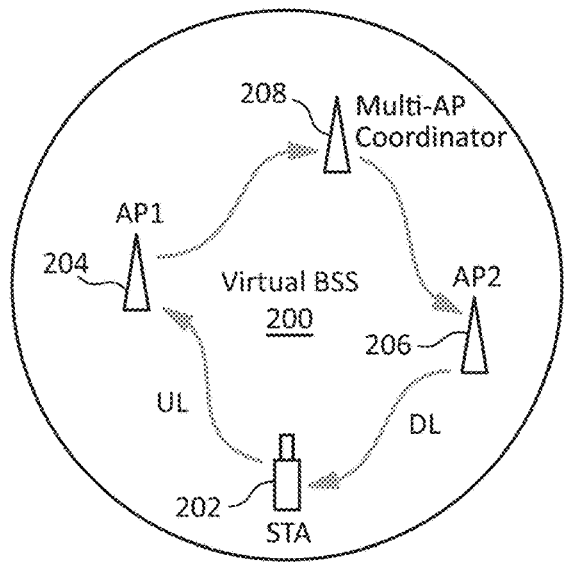
FIG. 2 illustrates an example embodiment of a virtual basic service set with more than one anchor access point according to this disclosure.

FIG. 2 illustrates an example embodiment of a V-BSS with more than one anchor AP according to this disclosure. Within the V-BSS 200, UL traffic may flow from a STA 202, to a coordinator 208, via a first member anchor AP 204. DL traffic may flow from the coordinator 208, to the STA 202, via a second member anchor AP 206.

Figure 3:
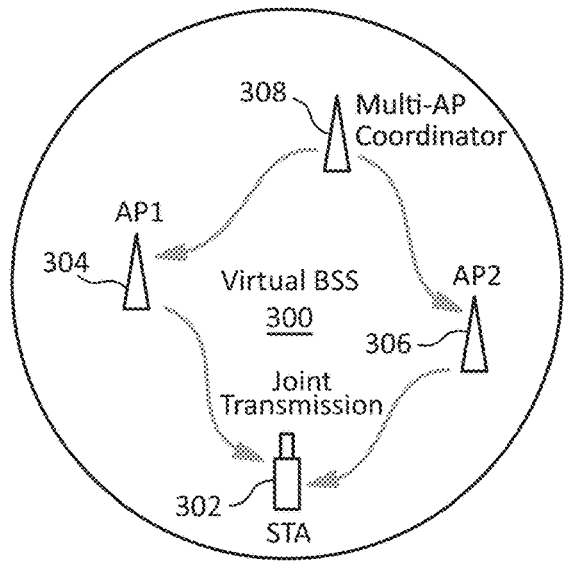
FIG. 3 illustrates another example embodiment of a virtual basic service set with more than one anchor access point according to this disclosure.

FIG. 3 illustrates another example embodiment of a V-BSS with more than one anchor AP according to this disclosure. Within the V-BSS 300, DL traffic may flow from a coordinator 302, to a STA 308, via both a first member anchor AP 304 and a second member anchor AP 306. In some embodiments, joint transmission can be performed using the same time and/or frequency resources, or different time and frequency resources (e.g., time division multiplexing (TDM) and/or frequency division multiplexing (FDM)).

In some embodiments where a STA driven AP selection scheme is used with multiple anchor APs, the STA may inform the coordinator of the list of anchor APs using, for example, a new management frame. In other embodiments where a coordinator controlled AP selection scheme is used with multiple anchor APs, the coordinator may choose anchor APs for a STA for DL traffic, and the STA may select an anchor AP for UL transmissions.

In some implementations, there may be more than one hop from the coordinator to the STA. In a coordinator controlled AP selection scheme with a multi-hop path, the coordinator 108 may select the path based on, for example, link quality metrics. In a STA driven AP selection scheme, the coordinator may no longer be able to find the anchor AP of the STA based on the UL data packets. Thus, after the STA selects or switches to a new anchor AP, the STA may inform the coordinator of its selected/updated anchor AP using a management frame so that the coordinator may update the routing for DL traffic to the STA.

Mobility Domains and Fast Transitions

In some embodiments, multi-AP coordination may be implemented using a mobility domain which may involve a fast handoff mechanism, also referred to as a Fast BSS Transition (FT), between APs.

Figure 4:
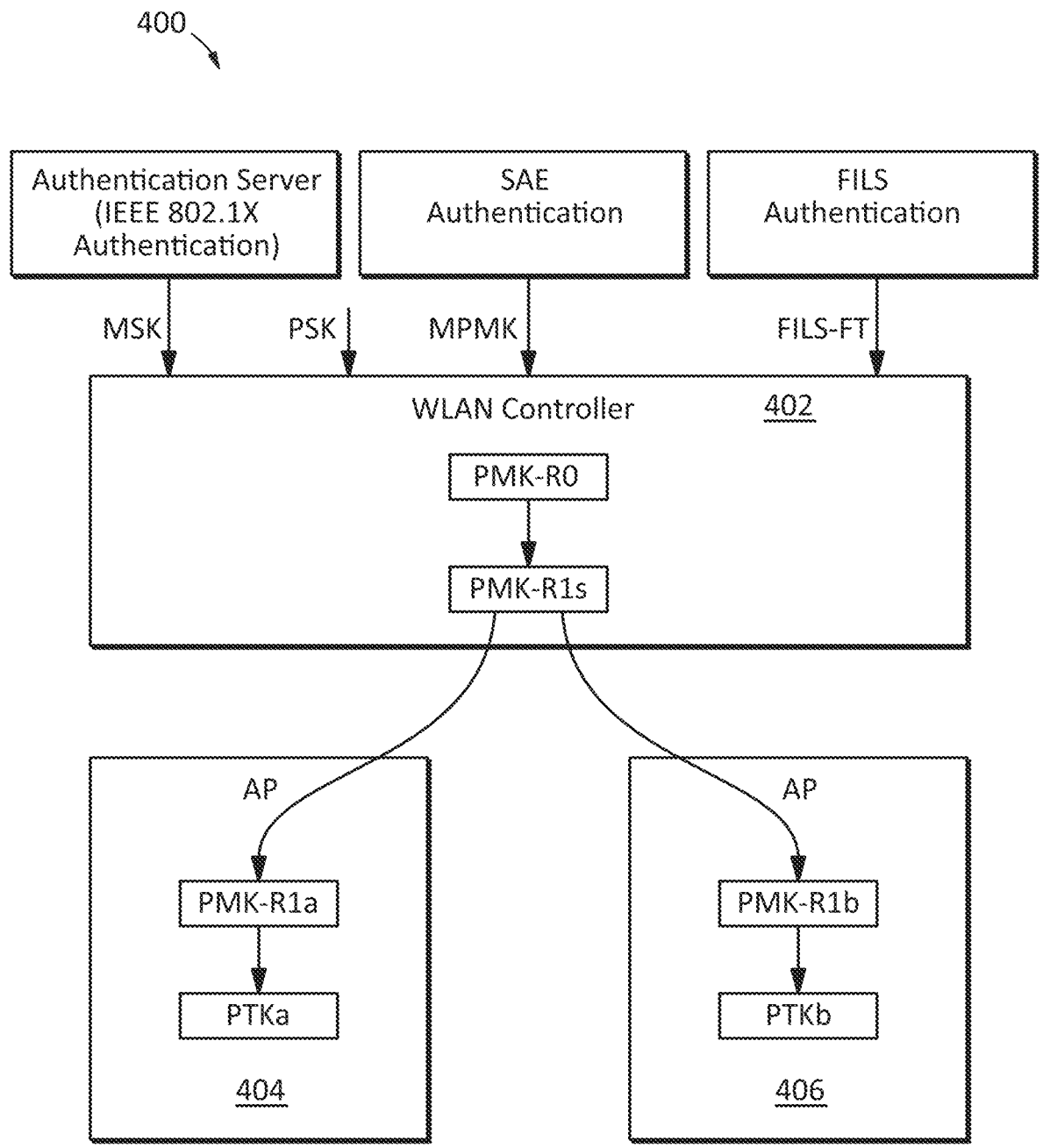
FIG. 4 illustrates an example embodiment of a mobility domain infrastructure.

FIG. 4 illustrates an example embodiment of a mobility domain infrastructure. The infrastructure 400 may include a wireless local area network (WLAN) controller 402, a first wireless AP 404, and a second wireless AP 406. The infrastructure 400 may implement a three-level FT key hierarchy, which may include a level 1 pairwise master key (PMK-R0) which may be derived by the WLAN controller 402 from a master session key (MSK) generated through an IEEE 802.1X authentication mechanism, for example, with a STA that is authenticating to the WLAN. Alternatively, the PMK-R0 may be derived from other master key sources such as a master PMK (MPMK) from a simultaneous authentication of equals (SAE) authentication, or an FILS-FT from a fast initial link setup (FILS) authentication. In some embodiments, the PMK-R0 may be obtained directly from a pre-shared key (PSK).

Level 2 pairwise master keys (PMK-R1s) may be derived by the WLAN controller 402 from the PMK-R0 and distributed to the APs 404 and 406 in the mobility domain. For security validation, the APs 404 and 406 may then generate level 3 pairwise transient keys (PTKs) by performing four-way handshakes with various STAs that may provide valid PMK-R0s in FT authentication request and/or FT action frames. This may enable an 802.1X authentication mechanism and/or a four-way handshake to be omitted when a STA transitions to a different AP. A mobility domain FT mechanism may implement a make-before-break approach in which the STA may finish authentication with a new (target) AP before breaking a connection with a current AP.

However, because a mobility domain FT mechanism may not enable simultaneous connectivity between a STA and multiple APs, a STA may need to disassociate from an existing AP connection, associate with a new AP, and re-establish agreements before data frame exchanges can be initiated with a new AP. The FT mechanism for this may involve a four-frame exchange for the transition, which may result in significant negotiation overhead for an AP transition.

Common Association and Authentication State

In some embodiments according to this disclosure, a STA can maintain simultaneous connectivity with more than one AP in a coordinated AP group by implementing a common or shared association and authentication state with the group.

A common association and authentication state according to this disclosure may take many different forms and may be established and/or maintained using many different association and/or authentication techniques.

For example, in some embodiments, a STA may perform an association with each AP in a coordinated AP group. In other embodiments, an association may initially be performed between a STA and a specific AP of a group, and the association may then be shared with other APs in the group, for example, by a coordinator of a V-BSS assigning an association identifier (AID) and distributing it to all APs in the coordinated AP group of the V-BSS.

As another example, a STA may perform an authentication with each AP in a coordinated AP group. In other embodiments, however, a STA may only perform an authentication with a coordinator of a V-BSS, and the APs may then serve as relays to forward data packets between the STA and the coordinator.

Thus, a common association and authentication state may not necessarily require association and authentication between a STA and each AP within a coordinated AP group, while still enabling the STA to maintain connectivity with each AP within the group. Moreover, in some embodiments, maintaining a common association and authentication state may enable a STA to maintain connectivity with multiple APs within a coordinated AP group in a manner that may reduce or eliminate sources of delay (such as negotiation overhead) when a STA begins exchanging data with a different AP.

The embodiments of association and authentication techniques described above are just a few of the endless variety of different techniques that may be used to implement a common association and authentication state according to this disclosure. For example, any of the association and/or authentication techniques described above and below may be implemented in hybrid combinations thereof. As another example, the association and/or authentication techniques used for uplink transmissions between a STA and a coordinated AP group may be different from those used for downlink transmissions. In some implementations, a STA may establish and/or maintain uplink and downlink connectivity between different subsets of APs in a coordinated group. The association and/or authentication techniques used between a first STA and a coordinated AP group may be different from those used between a second STA and the coordinated AP group. Moreover, different common association and authentication states may be established for different STAs that may form overlapping V-BSSs with one or more coordinated AP groups.

Some example embodiments of systems, processes, methods, features, techniques and/or the like illustrating some possible implementation details according to this disclosure are described below. These examples are provided for purposes of illustrating the principles of this disclosure, but the principles are not limited to these implementation details. For example, some embodiments may be described in the context of a V-BSS which may include a coordinated AP group having two member APs. However, the inventive principles are not limited to V-BSSs or any specific number of access points and may be applied to any types and/or arrangements of multi-AP coordination.

Association

Figure 5:
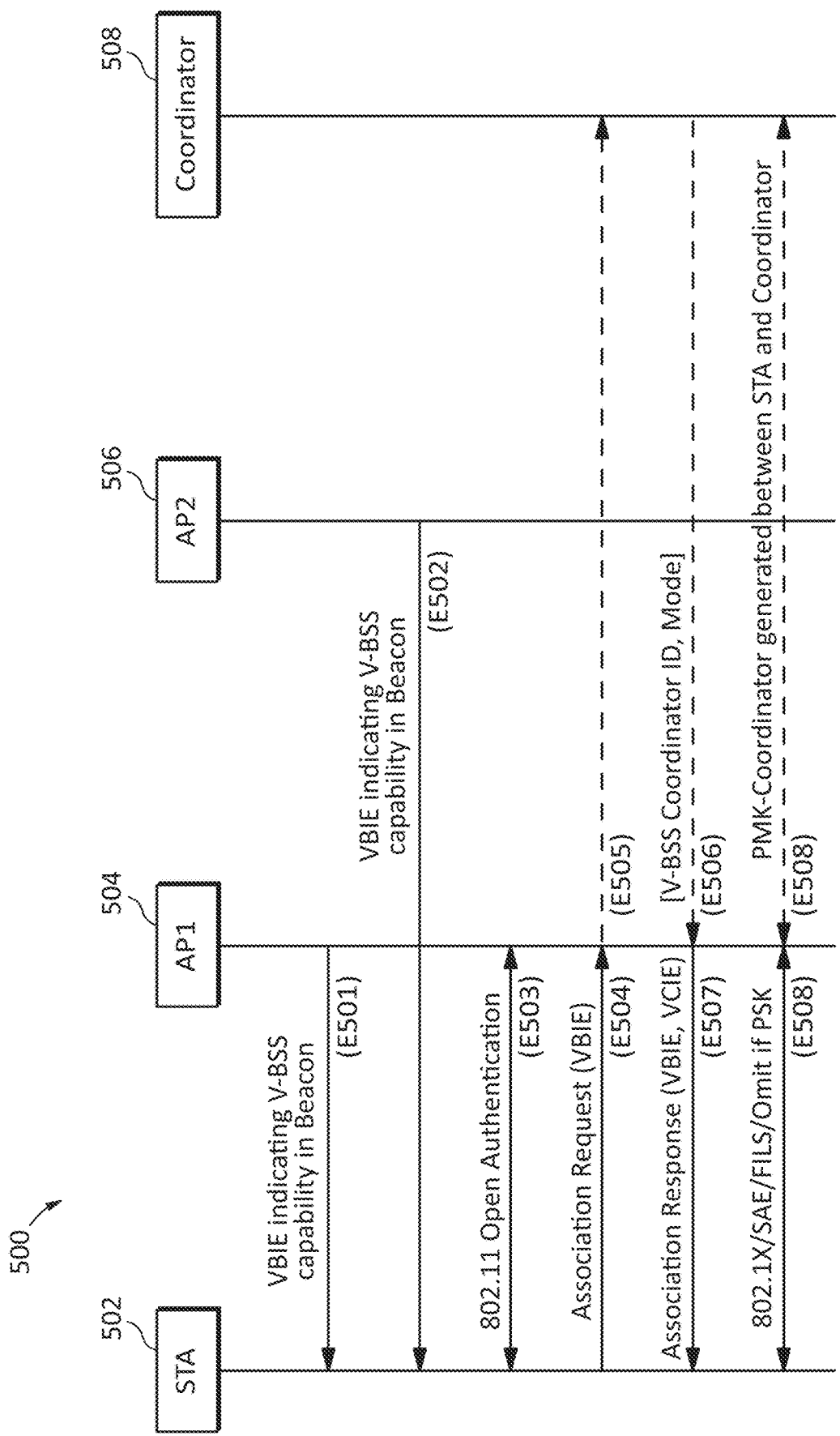
FIG. 5 is a sequence diagram illustrating an example embodiment of an association process for establishing a common association and authentication state according to this disclosure.

FIG. 5 is a sequence diagram illustrating an example embodiment of an association process for establishing a common association and authentication state according to this disclosure. The process illustrated in FIG. 5 may be described in the context of a V-BSS including a STA 502 and a coordinated AP group including a V-BSS coordinator 508, a first member AP 504 and a second member AP 506.

At the beginning of the process, one or more APs such as AP 504 and/or AP 506 may periodically broadcast a beacon frame that may advertise the V-BSS capability of the coordinated AP group. This capability may be indicated, for example, by the inclusion of a virtual BSS information element (VBIE) in the beacon frame. At event E501, the STA 502 may receive a beacon including a VBIE from the first AP 504. Additionally, or alternatively, at event E502 the STA 502 may receive a beacon including a VBIE from the second AP 506.

Having been made aware of the V-BSS capability of the coordinated AP group from either or both of the APs, the STA 502 may initiate a series of events to perform an association for establishing a common association and authentication state. At event E503, the STA 502 may perform an IEEE 802.11 Open System Authentication with the first AP 504. At event E504, the STA 502 may transmit an association request to the AP 504, which may relay the association request to the coordinator 508 at event E505. The association request may include an indication in the VBIE that the STA 502 is requesting to establish a common association and authentication state.

At event E506, the coordinator 508 may respond by transmitting an association response to the AP 504 which may be relayed to the STA 502 at event E507. The association response may include information that may be used by the STA 502 in subsequent authentication and/or key generation operations. This information may be provided in the form of a virtual BSS coordinator information element (VCIE), which may include, for example, a V-BSS coordinator identifier (V-BSS Coordinator ID) and/or a mode indicator. In some embodiments, the V-BSS Coordinator ID may function as a key holder ID for purposes of generating a pairwise master key (PMK). In some embodiments, the mode indicator may inform the STA 502 of an authentication mode to be used during a subsequent authentication process, for example, for generating temporal keys.

Figure 6:
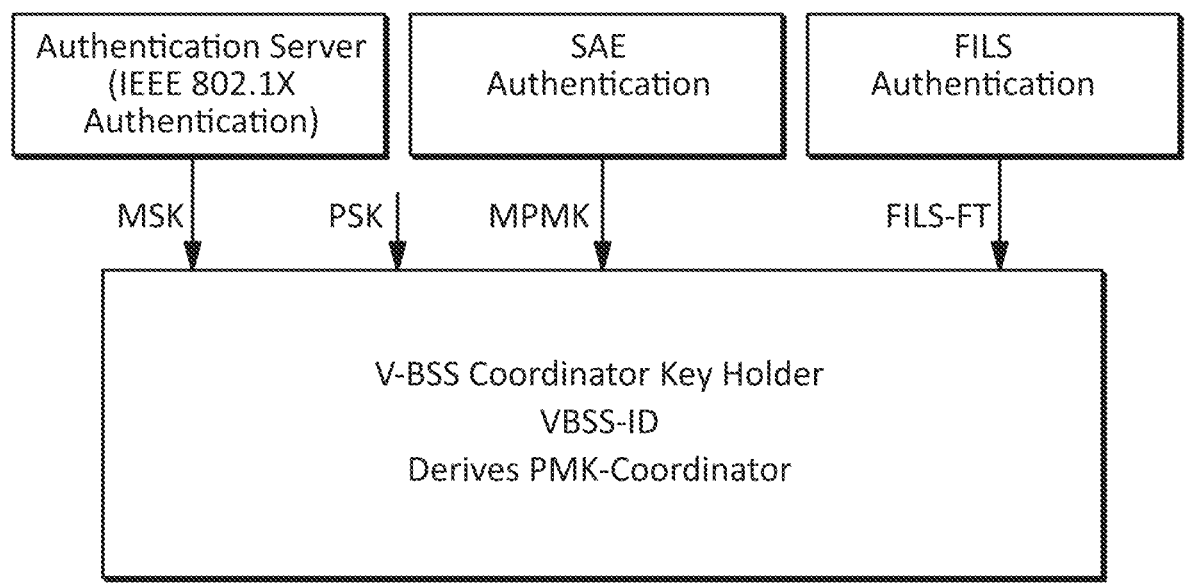
FIG. 6 illustrates an example embodiment of a coordinator and possible sources of a master key according to this disclosure.

At event E508, the STA 502 may perform an authentication in which a PMK may be generated between the STA 502 and the coordinator 508. This PMK may be referred to as a PMK-Coordinator. In some embodiments, the PMK-Coordinator may be derived from a master session key MSK which may be generated through an IEEE 802.1X authentication process. In other embodiments, the PMK-Coordinator may be generated through other processes as shown in FIG. 6. For example, the PMK may be derived from a master PMK (MPMK) from a simultaneous authentication of equals (SAE) authentication, or an FILS-FT from a fast initial link setup (FILS) authentication. In some embodiments, the PMK may be obtained directly from a pre-shared key (PSK), in which case, the PMK generation at event E07 may be omitted.

In the embodiment illustrated in FIG. 5, the STA 502 and the coordinator 508 may perform the authentication through the AP 504, but in other embodiments, the STA 502 and the coordinator 508 may perform the authentication through a different AP or through any other path. Also in the embodiment illustrated in FIG. 5, the V-BSS capability of the coordinated AP group may be advertised through beacon frames. In other embodiments, however, the V-BSS capability of the coordinated AP group may be advertised in other ways, for example, through probe response frames transmitted in response to probe request frames broadcast by a STA, or through an association response frame transmitted in response to an association request frame.

Authentication

In some embodiments, after a security association has been established between a STA and a coordinator (i.e., the association portion of a common association and authentication state), the STA may perform an authentication, for example, to generate temporal keys for exchanging data with the coordinated AP group (i.e., the authentication portion of a common association and authentication state). The type of authentication performed may depend on a wide range of considerations such as the capabilities of a coordinator in a V-BSS, the capabilities of the STA, the type and/or volume of data expected to be exchanged, the number and/or capabilities of the APs in the coordinated AP group and/or other considerations that may be relevant to maintaining connectivity between the STA and the coordinated AP group in a manner that may reduce or eliminate sources of delay (such as negotiation overhead) when a STA begins exchanging data with a different AP.

In some embodiments, authentication may be established and/or maintained in two modes: (1) a coordinator-level mode in which authentication may be performed between the STA and a coordinator, and (2) an AP-level mode in which authentication may be performed between the STA and one or more APs in the coordinated AP group. In other embodiments, only one mode may be implemented, other or additional modes may be implemented, and/or hybrid combinations of modes may be implemented.

Figure 7:
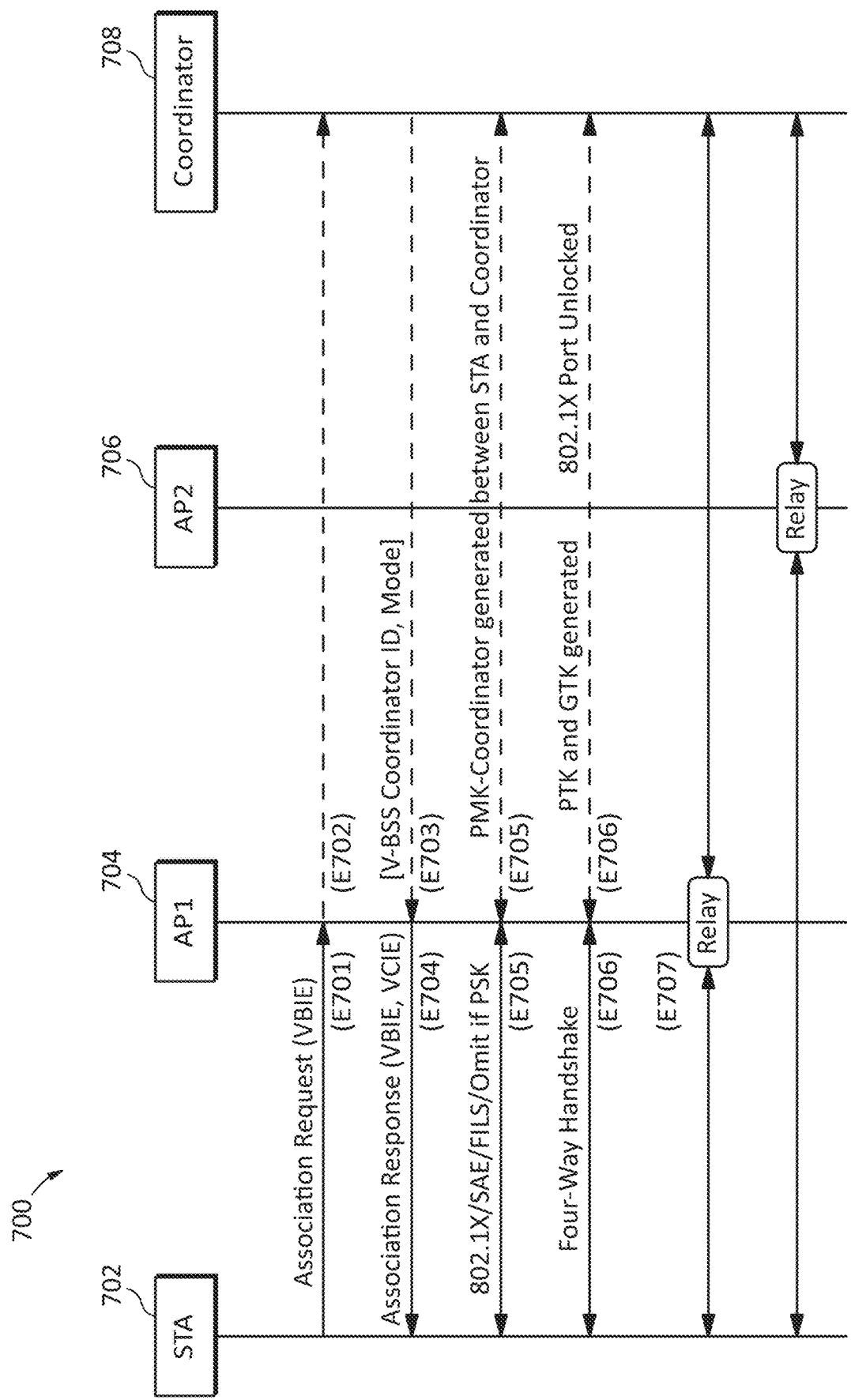
FIG. 7 is a sequence diagram illustrating an example embodiment of a coordinator-level authentication process for establishing a common association and authentication state according to this disclosure.

FIG. 7 is a sequence diagram illustrating an example embodiment of a coordinator-level authentication process for establishing a common association and authentication state according to this disclosure. As with the association process illustrated in FIG. 5, the authentication process 700 illustrated in FIG. 7 may be described in the context of a V-BSS including a STA 702 and a coordinated AP group including a V-BSS coordinator 708, a first member AP 704 and a second member AP 706.

The process may begin at event E701 where the STA 702 may send an association request including a VBIE to the AP 704, which may be forwarded at event E702 to the coordinator 708. The VBIE may include an indication that the STA 702 is requesting to establish a common association and authentication state with the coordinated AP group. The process may then proceed through events E703 through E705 in a manner similar to events E506 through E508 in FIG. 5 to generate a PMK-Coordinator between the STA 702 and the coordinator 708.

At event E706, the STA 702 may perform a four-way (e.g., four-frame) handshake in which a pairwise transient key (PTK) and a group temporal key (GTK) may be generated between the STA 702 and the coordinator 708 using the PMK-Coordinator. In embodiments based on IEEE 802.1X authentication, the four-way handshake may result in unlocking of one or more 802.1X controlled ports. The PTK and GTK may then be used for encrypted data transfers starting at event E707.

In some embodiments with coordinator-level authentication according to this disclosure, the coordinator 708 may be responsible for all, or a relatively large portion, of the data processing and/or security management for the coordinated AP group. For example, in some embodiments, the coordinator 708 may perform essentially all of the encryption and/or decryption. Thus, the APs 704 and 706 may serve as relays that may forward frames between the STA 702 and the coordinator 708. In some embodiments, the use of coordinator-level authentication may enable joint transmissions from APs in the coordinated group.

Some embodiments that implement coordinator-level authentication according to this disclosure may be used with a wide variety of multi-AP coordination techniques such as coordinated OFDMA, coordinated beamforming, null forming, joint AP transmission, and/or the like.

Figure 8:
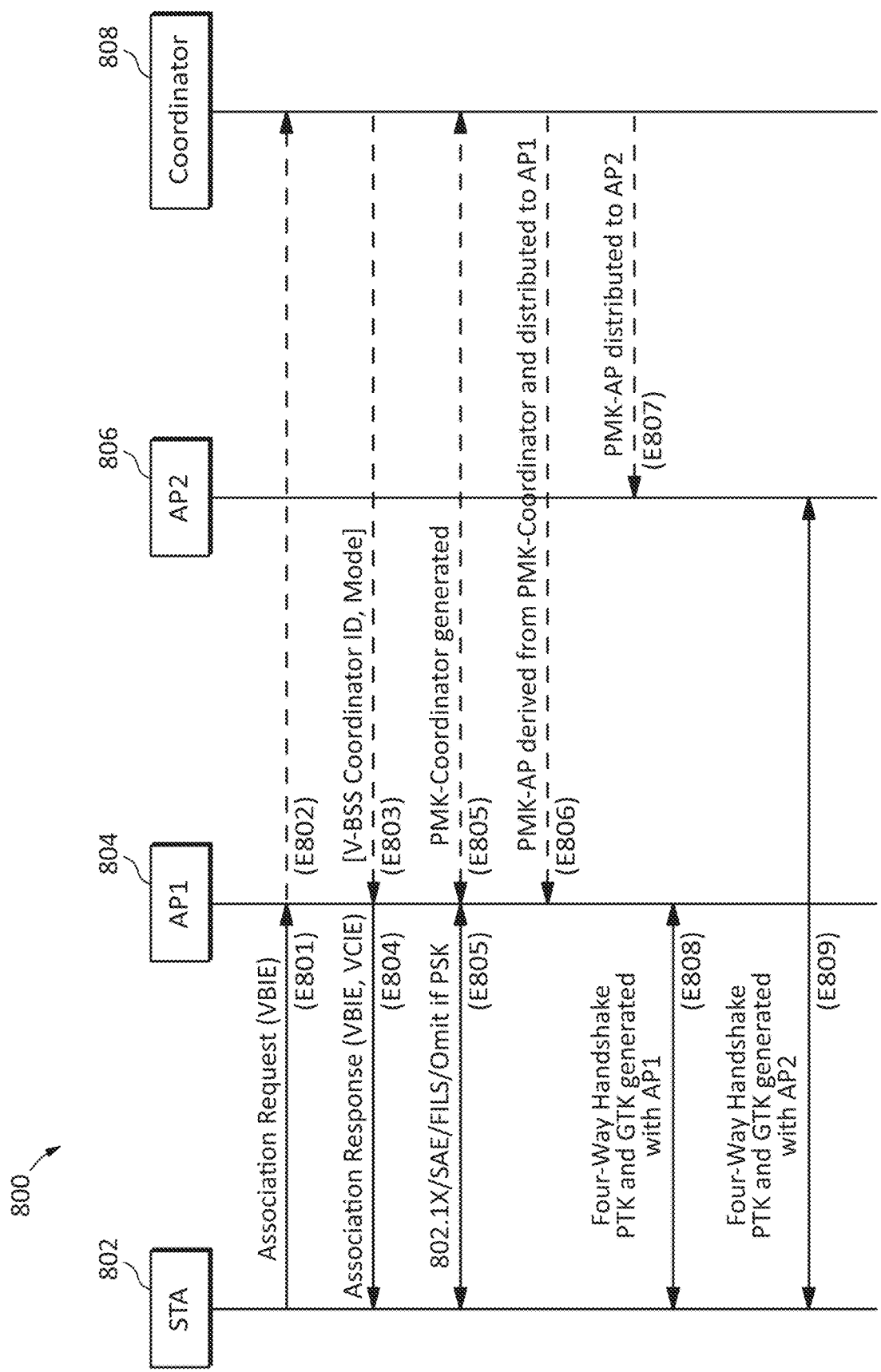
FIG. 8 is a sequence diagram illustrating an example embodiment of an AP-level authentication process for establishing a common association and authentication state according to this disclosure.

FIG. 8 is a sequence diagram illustrating an example embodiment of an AP-level authentication process for establishing a common association and authentication state according to this disclosure. As with the association processes illustrated in FIGS. 5 and 7, the authorization process 800 illustrated in FIG. 8 may be described in the context of a V-BSS including a STA 802 and a coordinated AP group including a V-BSS coordinator 808, a first member AP 804 and a second member AP 806.

The process may begin at event E801 the STA 802 may send an association request including a VBIE to the AP 804, which may be forwarded at event E802 to the coordinator 808. The process may then proceed through events E803 through E805 in a manner similar to events E703 through E705 in FIG. 7 to generate a PMK-Coordinator between the STA 802 and the coordinator 808.

At events E806 and E807, the coordinator 808 may derive AP-level pairwise master keys (PMK-APs) from the PMK-Coordinator and distribute them to the APs 804 and 806. At event E808, the STA 802 may perform a first four-way handshake with the first AP 804. During the first handshake, a pairwise transient key (PTK1) and a group temporal key (GTK1) may be generated between the STA 802 and the first AP 804 using the PMK-AP that was distributed to the first AP 804. At event E809, the STA 802 may perform a second four-way handshake with the second AP 806. During the second handshake, a pairwise transient key (PTK2) and a group temporal key (GTK2) may be generated between the STA 802 and the second AP 806 using the PMK-AP that was distributed to the second AP 806. The PTKs and GTKs may then be used for encrypted data transfers. Thus, in some embodiments, separate keys maintained for each AP, and corresponding keys may be used for communication between the STA and a corresponding AP.

In some embodiments with AP-level authentication according to this disclosure, the temporal keys may be generated, for example, using a mechanism similar that described above with respect to a mobility domain for fast transitions. Moreover, if a STA only authenticates with a single AP, transitions may be implemented using a mechanism similar that described above with respect to a mobility domain for fast transitions.

In some embodiments with AP-level authentication according to this disclosure, a STA may select only those APs with which it has successfully completed authentication for exchanging data frames.

Some embodiments that implement AP-level authentication according to this disclosure may be used with a wide variety of multi-AP coordination techniques such as coordinated OFDMA, coordinated beamforming, null forming, and/or the like.

In some embodiments, and depending on the implementation details, a common association and authentication state according to this disclosure may reduce or eliminate one or more problems associated a STA transitioning between APs. For example, if a STA is located at a boundary where two APs may provide about the same quality of service (QoS), and AP that may provide the best QoS keeps flipping back and forth between the two APs, the STA may frequently transition between the APs while evaluating the best QoS. However, the negotiation overhead associated with each transition (ping-pong overhead) may consume a large percentage of total transmission time, thereby resulting in low performance. To overcome this problem, some systems may implement a threshold time or QoS differential that may cause the STA to remain with (stick to) one AP to prevent flipping back and forth, but this may cause the STA to forgo a connection that may provide better performance. However, by reducing or eliminating negotiation overhead, some embodiments according to this disclosure may enable a STA to always or more frequently select an AP that may provide better performance.

Data Connectivity

Figure 9:
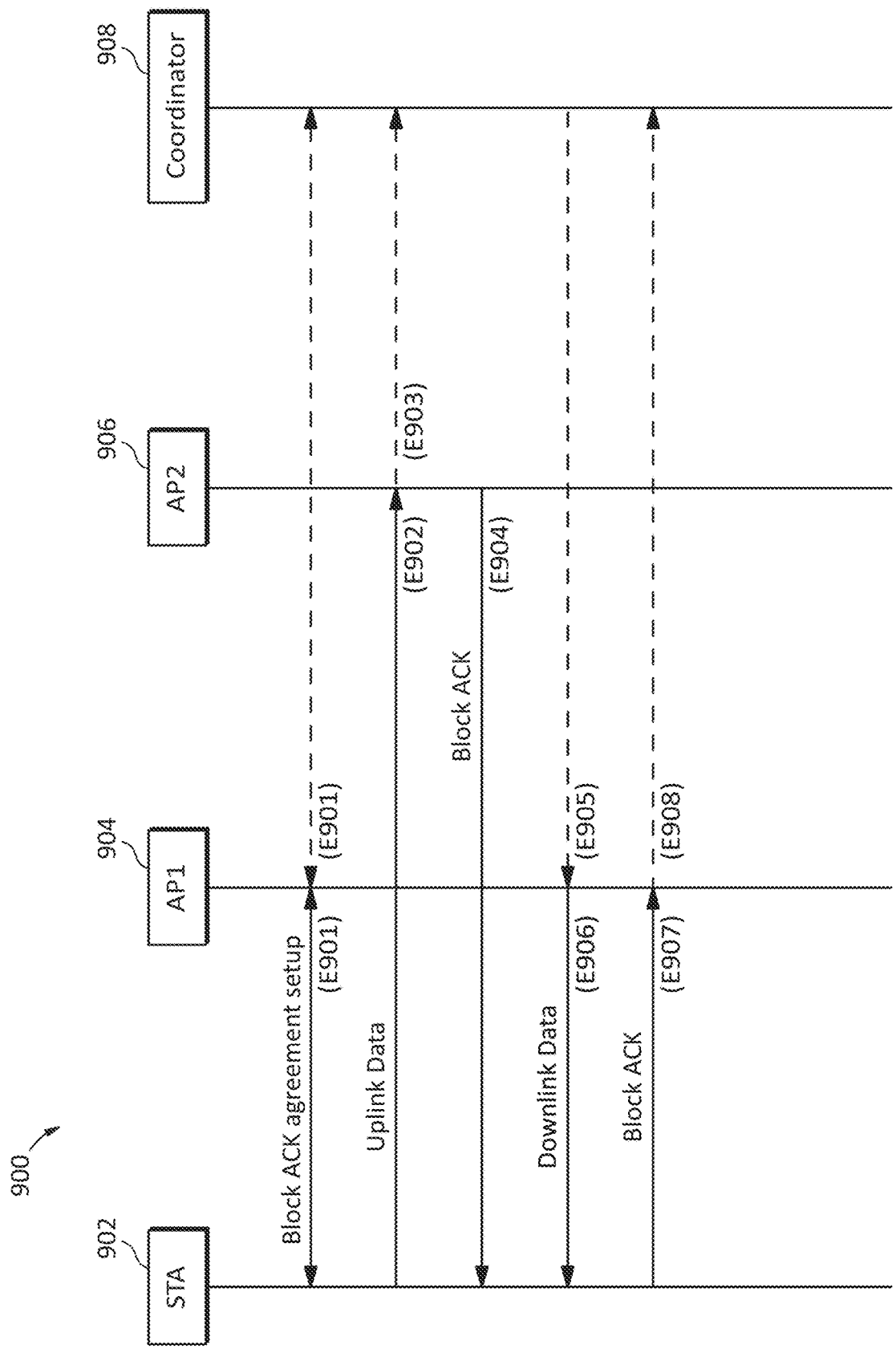
FIG. 9 is a sequence diagram illustrating an example embodiment of data connectivity for a coordinated AP group that has established a common association and authentication state according to this disclosure.

FIG. 9 is a sequence diagram illustrating an example embodiment of data connectivity for a coordinated AP group that has established a common association and authentication state according to this disclosure. The embodiment 900 illustrated in FIG. 9 may be described in the context of a V-BSS including a STA 902 and a coordinated AP group including a V-BSS coordinator 908, a first member AP 904 and a second member AP 906.

In the embodiment illustrated in FIG. 9, a common association and authentication state may have been established between the STA 902 and the coordinated AP group using any of the techniques described above. At event E901, a block acknowledgment agreement may set up between the STA 902 and the coordinator 908 (communicating through the first AP 904). This may enable a block acknowledgment agreement to be shared at the V-BSS coordinator level. In some embodiments, a block acknowledgment agreement may be implemented, for example, for QoS purposes.

After the block acknowledgment agreement has been set up, and the common association and authentication state has been established, the STA may be free to dynamically select an AP that may provide the best QoS at any level of granularity, for example, frame-by-frame, uplink and/or downlink, and/or the like. For example, at event E902, the STA 902 may transmit a block of uplink data to the second AP 906 which may relay the block to the coordinator 908 at event E903. The second AP 906 may send a block acknowledgment to the STA 902 at event E904. However, at event E905, a downlink data block may be transmitted from the coordinator 908 the first AP 904, which may relay the downlink data block to the STA 902 at event E906. The STA 902 may then send a block acknowledgment to the first AP 904 at event E907, which may then relay the acknowledgment to the coordinator 908 at event E908.

As illustrated in FIG. 9, in some embodiments, the use of a common association and authentication state may enable dynamic AP selection in both the uplink and downlink directions. It may also enable data frames to be sent seamlessly from different APs to a STA, and from a STA to different APs in a coordinated AP group.

Figure 10:
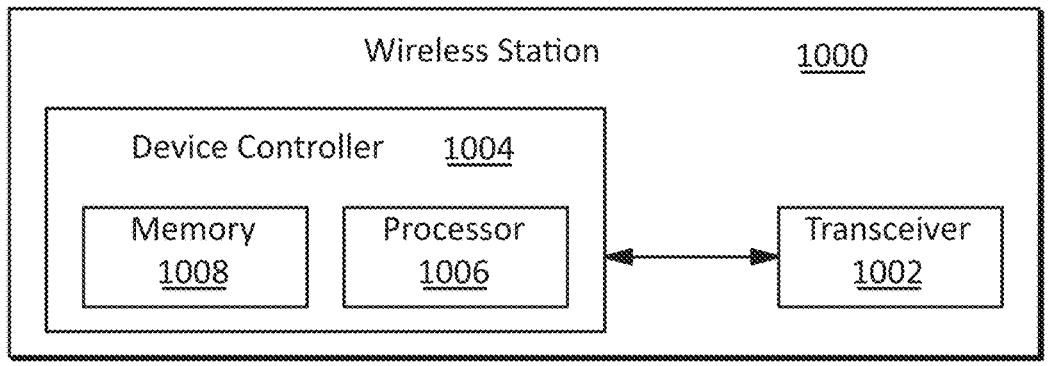
FIG. 10 illustrates an example embodiment of a wireless station according to this disclosure.

FIG. 10 illustrates an example embodiment of a wireless station according to this disclosure. The wireless station 1000 illustrated in FIG. 10 may include a radio transceiver 1002 and a device controller 1004 which may control the operation of the transceiver 1002 and/or any other components in the wireless station 1000. The wireless station 1000 may be used, for example, to implement any of the wireless station (STA) functionality described in this disclosure such as establishing and/or maintaining a common association and authentication state, generating keys, exchanging data frames, and/or the like. The device controller 1004 may include, for example, one or more processors 1006 and a memory 1008 which may store instructions for the one or more processors 1006 to execute to implement any of the wireless station functionality described in this disclosure.

For example, in some embodiments, the device controller 1004 may be configured to communicate, through the wireless transceiver 1002, with a coordinated AP group, generate a PMK between the STA and a coordinator of the coordinated AP group, and maintain an association and authentication state between the STA and the coordinated AP based on the PMK.

Figure 11:
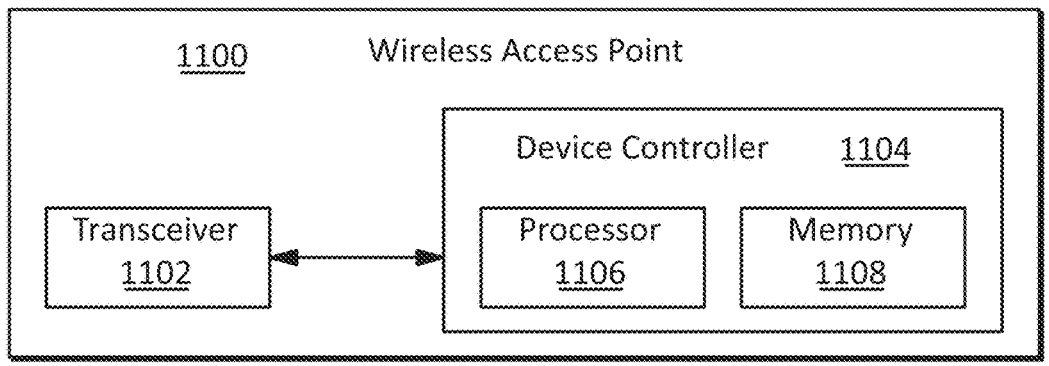
FIG. 11 illustrates an example embodiment of a wireless access point according to this disclosure.

FIG. 11 illustrates an example embodiment of a wireless access point according to this disclosure. The wireless access point 1100 illustrated in FIG. 11 may include a radio transceiver 1102 and a device controller 1104 which may control the operation of the transceiver 1102 and/or any other components in the wireless access point 1100. The wireless access point 1100 may be used, for example, to implement any of the wireless access point (AP) functionality described in this disclosure such as establishing and/or maintaining a common association and authentication state, generating keys, exchanging data frames, and/or the like. The device controller 1104 may include, for example, one or more processors 1106 and a memory 1108 which may store instructions for the one or more processors 1106 to execute to implement any of the AP functionality described in this disclosure.

For example, in some embodiments, the device controller 1104 may be configured to communicate, through the wireless transceiver 1102, with a STA, and maintain an association and authentication state between the STA and coordinated AP group based on a PMK.

Figure 12:
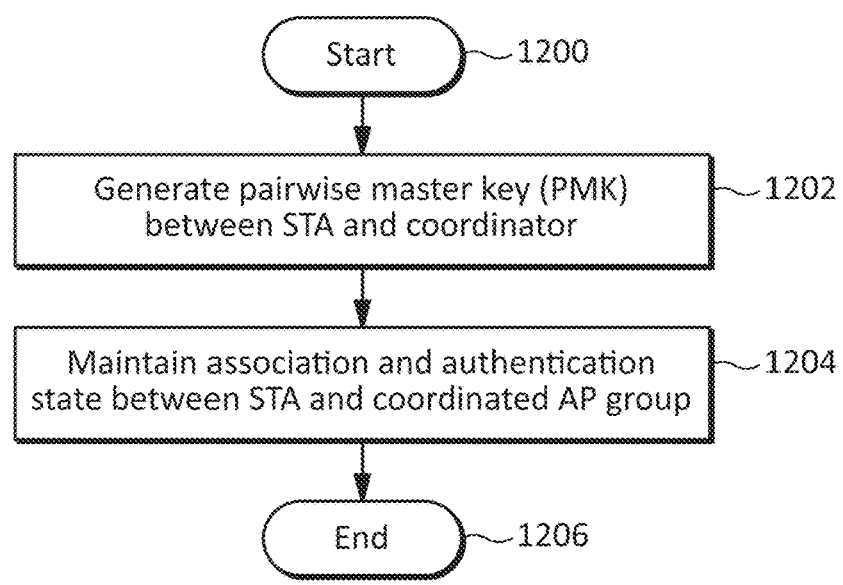
FIG. 12 illustrates an example embodiment of a method for associating and authenticating a STA with a coordinated AP group according to this disclosure.

FIG. 12 illustrates an example embodiment of a method for associating and authenticating a STA with a coordinated AP group according to this disclosure. The method may begin at operation 1200. At operation 1202, the method may generate a pairwise master key (PMK) between the STA and a coordinator of the coordinated AP group. At operation 1204, the method may maintain an association and authentication state between the STA and the coordinated AP group based on the PMK. The method may end at operation 1206.

The operations and/or components described with respect to the embodiments illustrated in FIGS. 10-12, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

This disclosure encompasses numerous inventive principles relating to association and authentication for multi access point coordination. These principles may have independent utility and may be embodied individually, and not every embodiment may utilize every principle. Moreover, the principles may also be embodied in various combinations, some of which may amplify the benefits of the individual principles in a synergistic manner.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element.

The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method for associating and authenticating a station (STA) with a coordinated access point (AP) group, the method comprising:
performing, by a coordinator, coordinator-level authentication with the coordinated AP group to enable a joint transmission from a first member AP and a second member AP of the coordinated AP group;
performing, by the coordinator, encryption and decryption for the coordinated AP group, and the first member AP or the second member AP of the coordinated AP group serves as a relay to forward data between the STA and the coordinator;
generating, by the coordinator, a coordinator level pairwise master key (PMK-Coordinator) between the STA and the coordinator of the coordinated AP group;
generating a Pairwise Transient Key (PTK) and a Group Temporal Key (GTK) between the STA and the coordinator using the PMK-Coordinator; and
maintaining an association and authentication state between the STA and the coordinated AP group based on the PMK-coordinator.

2. The method of claim 1, further comprising performing a handshake between the STA and the coordinator through the member AP of the coordinated AP group.

3. The method of claim 1, further comprising performing joint transmissions between the STA and the first and the second member AP of the coordinated AP group.

4. The method of claim 1, further comprising performing a four-way handshake in which the PTK and GTK are generated.

5. The method of claim 4,
wherein the four-way handshake results in unlocking a controlled port.

6. The method of claim 5, wherein:
the PTK and GTK are used for encrypted data transfers.

7. The method of claim 1, wherein the coordinated AP group is advertised in one or more of a beacon, a probe response, or an association response.

8. The method of claim 1, further comprising:
sending an association request from the STA to the coordinated AP group through the member AP of the coordinated AP group; and
sending an association response from the coordinated AP group to the STA through the member AP, wherein the association response indicates a mode for authenticating the STA with the coordinated AP group.

9. The method of claim 8, wherein the association response comprises a coordinator key holder identifier (ID).

10. The method of claim 1, further comprising dynamically selecting at least one anchor AP for the STA from one or more member APs in the coordinated AP group.

11. The method of claim 1, wherein the STA and the coordinated access point (AP) group comprise a virtual basic service set (V-BSS).

12. The method of claim 11, wherein the V-BSS is advertised using a V-BSS information element (VBIE) in a beacon frame.

13. A system comprising:
a coordinated access point (AP) group comprising a first member AP and a second member AP;
a wireless station (STA);
a coordinator configured to:
perform coordinator-level authentication with the coordinated AP group to enable a joint transmission from the first member AP and the second member AP of the coordinated AP group;
perform encryption and decryption for the coordinated AP group, and the first member AP or the second member AP of the coordinated AP group serves as a relay to forward data between the STA and the coordinator;
generate a coordinator level pairwise master key (PMK-Coordinator) between the STA and the coordinator of the coordinated AP group;
generate a Pairwise Transient Key (PTK) and a Group Temporal Key (GTK) between the STA and the coordinator using the PMK-Coordinator; and
maintain an association and authentication state between the STA and the coordinated AP group based on the PMK-coordinator.

14. A memory storing instructions for associating and authenticating a station (STA) with a coordinated access point (AP) group, the instructions which when executed by at least one processor, cause the at least one processor of a coordinator to:
perform coordinator-level authentication with the coordinated AP group to enable a joint transmission from a first member AP and a second member AP of the coordinated AP group;
perform encryption and decryption for the coordinated AP group, and the first member AP or the second member AP of the coordinated AP group serves as a relay to forward data between the STA and the coordinator;
generate a coordinator level pairwise master key (PMK-Coordinator) between the STA and the coordinator of the coordinated AP group;
generate a Pairwise Transient Key (PTK) and a Group Temporal Key (GTK) between the STA and the coordinator using the PMK-Coordinator; and
maintain an association and authentication state between the STA and the coordinated AP group based on the PMK-coordinator.

* * * * *